April 7, 1959  A. L. SUCCOP  2,880,676
MOTOR AND PUMP COMBINATION
Filed March 26, 1956
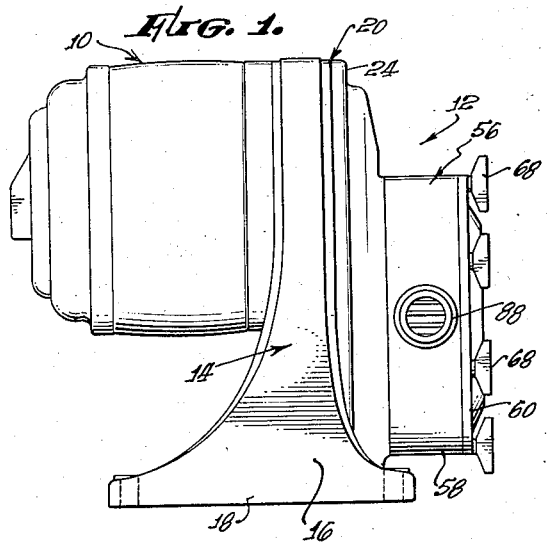
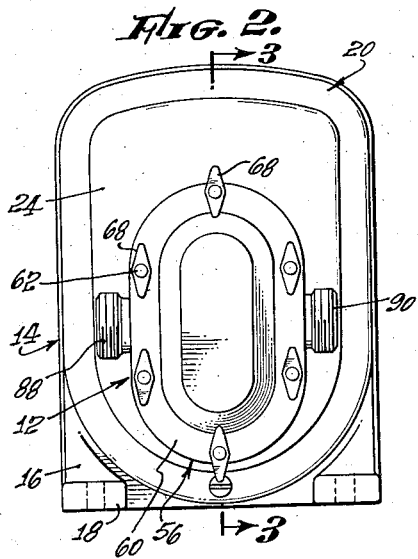
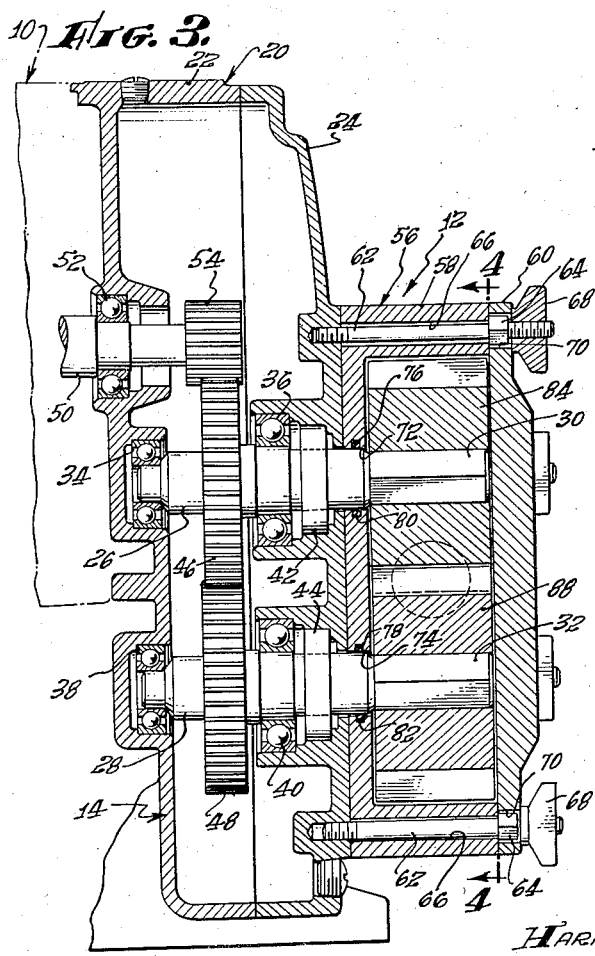
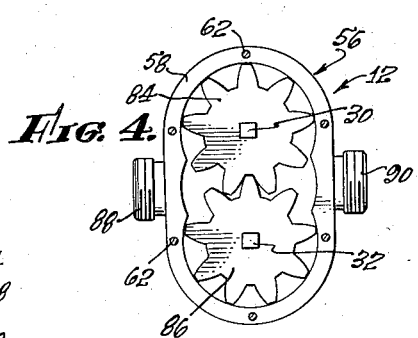
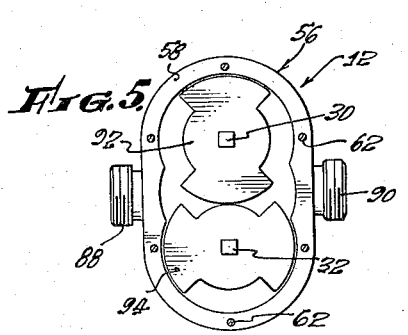
ANNA LOUISE SUCCOP,
INVENTOR.
BY HER ATTORNEYS.
HARRIS, KIECH, FOSTER & HARRIS.

United States Patent Office 2,880,676
Patented Apr. 7, 1959

2,880,676
MOTOR AND PUMP COMBINATION

Anna Louise Succop, Los Angeles, Calif.

Application March 26, 1956, Serial No. 573,966

9 Claims. (Cl. 103—118)

The present invention relates in general to pumps and, more particularly, to a pump of the so-called sanitary type for handling various materials, such as food products, chemicals, and the like.

A primary object of the present invention is to provide a motor and pump combination which is a compact and virtually integral unit and all of the components of which are readily maintained in a sanitary condition, as contrasted to prior devices wherein only the pumps are capable of being maintained in a sanitary state.

Another object of the invention is to provide a compact motor and pump unit which includes a pedestal having a vertically oriented gear case thereon, which includes a slow speed electric motor mounted on one side of the gear case and adapted to drive gearing therein, and which includes a pump mounted on the opposite side of the gear case and adapted to be driven by the gearing therein.

An important object of the invention is to provide a motor and pump combination of the foregoing nature wherein the centerline of the motor is located a substantial distance above the centerline of the pump. By locating the motor axis above the pump axis in this manner, ample clearance for cleaning around and under the motor to meet sanitary requirements is provided, which is an important feature of the invention. Also, locating the motor on the gear case at a higher level than the pump provides a clearance under the motor which is ample to protect the motor against damage by water, steam, or the like, used during cleaning operations.

Another object is to provide a motor and pump combination which includes two parallel, horizontal output shafts having ends projecting from the gear case into the pump housing to drive pump impellers within the pump housing, and which includes a horizontal input shaft, constituted by the motor shaft, projecting into the gear case and geared to both of the output shafts in such a manner as to drive the output shafts in opposite directions. A related object is to provide gearing between the input and output shafts which includes two meshed gears on the output shafts and a drive gear on the input shaft and meshed with the gear on one of the output shafts, whereby the output shafts are driven in opposite directions.

An important object of the invention is to locate the output shafts and the input shaft in vertical alignment, i.e., in a vertical plane, with the input or motor shaft located above the two output shafts. Arranging the three shafts in vertical alignment with the motor shaft above the output shafts in this manner results in locating the motor axis a substantial distance above the pump centerline, which is an important feature of the invention for the reasons hereinbefore discussed.

Another object is to detachably mount the pump on the gear case so that it may be removed readily for cleaning, or for other purposes.

Another object of the invention is to provide a pump housing which includes a pump housing body and a cover therefor, and to provide means for securing the pump housing body and the cover to the gear case, including studs extending through the pump housing body and threaded into the gear case and provided with heads seated against the pump housing body, and including nuts threaded on such studs outwardly of the heads thereon and seated against the pump housing cover. With this construction, the nuts may be removed from the studs to permit removal of the pump housing cover for access to the interior of the pump housing, as for the purpose of changing pump impellers, or the like. By unscrewing the studs from the gear case, the entire pump housing may be detached for cleaning, or other purposes.

A further object of the invention is to provide seals between the gear case and the output shafts for preventing leakage from the gear case along the output shafts, and to provide seals between the pump housing and the output shafts for preventing leakage from the pump housing along the output shafts, the latter seals being carried by the pump housing and being slidable axially of the output shafts so as to be automatically removable therefrom upon separation of the pump housing from the gear case. With this construction, the seals between the pump housing and the output shafts are automatically removed for cleaning upon removal of the pump housing for cleaning, which is an important feature.

Another object of the present invention is to provide pump impellers of a polymerized tetrafluoroethylene resin, such as "Teflon." Important advantages of "Teflon" pump impellers are that they are nontoxic, impervious, inert with respect to all materials to be pumped, and self-lubricating. Another advantage of "Teflon" pump impellers is that they may be loosely mounted on the output shafts without close tolerances so that they may be installed on and removed from the output shafts very readily. The provision of such loosely fitting "Teflon" impellers will not result in wearing or galling, which is not true of impellers of other materials.

Another object of the invention is to provide a pump all components of which, including the pump housing body, the pump housing cover, the pump impellers and the output shafts, are formed of "Teflon." Such a pump is particularly desirable where extremely sanitary conditions must be maintained, as in handling milk products, for example, or where corrosive materials are being pumped.

The foregoing objects, advantages, features and results of the present invention, together with various other objects, advantages, features and results thereof which will be evident to those skilled in the art in the light of the present disclosure, may be attained with the exemplary embodiment of the invention which is illustrated in the accompanying drawing and which is described in detail hereinafter. Referring to the drawing:

Fig. 1 is a side elevational view of a motor and pump unit of the invention;

Fig. 2 is an end elevational view thereof taken from the right end of Fig. 1;

Fig. 3 is an enlarged, fragmentary sectional view taken along the arrowed line 3—3 of Fig. 2;

Fig. 4 is a sectional view on a reduced scale taken along the arrowed line 4—4 of Fig. 3; and Fig. 5 is a sectional view similar to Fig. 4, but illustrating pump impellers of a different type.

Referring to the drawing, the motor and pump combination of the invention includes a motor 10 and a pump 12 mounted on opposite sides of an upright supporting structure 14 with the motor located at a higher level than the pump to facilitate cleaning around and under the motor and to prevent damage to the motor during cleaning operations. The supporting structure 14 includes a pedestal 16 having a base 18 adapted to be bolted, or otherwise secured, to a suitable supporting surface with the base flat against such surface to prevent entry of liquids beneath the base.

As best shown in Fig. 3 of the drawing, the supporting structure 14 includes a vertically oriented gear case 20 mounted on the pedestal 16. The gear case 20 includes a gear case body 22 integral with the pedestal 16, and includes a cover 24 which is bolted, or otherwise secured, to the gear case body in a manner not shown in the drawing. Two parallel, horizontal output shafts 26 and 28 are rotatably mounted in the gear case 20 one above the other in vertical alignment and are provided with ends 30 and 32 which project from the gear case, through openings in the cover 24, into the pump 12. The output shaft 26 is mounted in bearings 34 and 36 respectively carried by the gear case body 22 and the cover 24 and the output shaft 28 is similarly mounted in bearings 38 and 40 respectively carried by the gear case body and the cover. Shaft seals 42 and 44 are interposed between the respective output shafts 26 and 28 and the cover 24 to prevent lubricant leakage from the gear case 20 along the output shafts. Fixed on the respective output shafts 26 and 28 between the respective supporting bearings therefor are meshed metallic gears 46 and 48, whereby both output shafts are positively driven and are driven in opposite directions.

Mounted on the gear case body 22 adjacent the upper end thereof is the motor 10, the housing of the motor being bolted, or otherwise secured, to the gear case body in any suitable manner, not shown. The shaft, 50, of the motor 10, hereinafter referred to as an input shaft, projects horizontally into the gear case 20 above the output shafts 26 and 28 through a bearing 52 carried by the gear case body 22, the input shaft 50 having fixed on its inner end a drive gear 54 which is meshed with the gear 46 on the output shaft 26. The output shafts 26 and 28 and the input shaft 50 are all located in vertical alignment, i.e., are so located that their axes are all in a single vertical plane, with the input shaft above the output shafts. With this shaft arrangement, the axis of the motor 10 is located a substantial distance above the centerline of the pump 12, which is an important feature of the invention for the reasons hereinbefore indicated.

Considering the pump 12, it includes a pump housing 56 comprising an open-ended pump housing body 58 and a cover 60. The pump housing body 58 is detachably connected to the gear case 20, i.e., to the cover 24 of the gear case, by studs 62 which are provided with heads 64 seated against the outer end of the pump housing body, the studs extending through holes 66 in the pump housing body and being threaded into the gear case cover. As will be apparent, the pump housing body may be removed readily by unscrewing the studs 62. The pump housing cover 60 is secured to the pump housing body 58 by means of nuts 68 threaded on the studs 62 outwardly of the heads 64 thereon, the cover 60 being provided with holes 70 therethrough which receive the heads 64. In the particular construction illustrated, the nuts 68 are wing nuts for easy removal of the pump housing cover 60.

The projecting ends 30 and 32 of the output shafts 26 and 28 extend into the pump housing 56 through holes 72 and 74, respectively, in the pump housing body 58. Disposed in annular grooves 76 and 78 in the respective peripheral walls of the holes 72 and 74 are O-ring seals 80 and 82 for preventing leakage from the pump housing 56 along the output shafts 26 and 28. With this construction, when the pump housing body 58 is removed from the gear case 20 for cleaning, or the like, the seals 80 and 82 are automatically removed at the same time by sliding them axially off the projecting ends 30 and 32 of the output shafts 26 and 28.

Thus, when the pump housing 56 is detached from the gear case 20, all parts which come in contact with the fluid being pumped, except for the projecting ends 30 and 32 of the output shafts, are removed at the same time, which is an important feature of the invention.

Mounted on the projecting ends 30 and 32 of the output shafts 26 and 28 within the pump housing 56 are pump impellers 84 and 86 of polytetrafluorethylene, e.g., "Teflon." Impellers 84 and 86 of this material have the advantages of being nontoxic, easily cleaned, impervious, inert to substantially all fluids to be pumped, and self-lubricating. Also, by making the impellers 84 and 86 of this material, the impellers can be loosely mounted on the projecting shaft ends 30 and 32 for easy installation and removal, without producing any wear or galling. In the particular construction illustrated, the projecting shaft ends 30 and 32 are squared and the impellers 84 and 86 are provided with square holes therethrough which receive the squared shaft ends with loose fits. With this construction, the impellers 84 and 86 may be removed and installed very easily, which is an important feature.

For special applications where extreme sanitation is necessary, or where extremely corrosive conditions exist, I prefer to make all of the components of the pump 12 which come in contact with the pumped fluid of "Teflon" to attain the hereinbefore-discussed advantages accruing from the use of this material. In other words, the output shafts 26 and 28, the pump housing body 58, the pump housing cover 60, the O-ring seals 80 and 82 and the impellers 84 and 86 may all be made of "Teflon" for this purpose.

The pump housing 56 and, specifically, the pump housing body 58, is provided with inlet and outlet fittings one identified by the numeral 88 and one by the numeral 90. In the particular construction illustrated, the fittings 88 and 90 are of the type to have couplings threaded thereonto, although other types of fittings may be utilized. The fittings 88 and 90 are located in horizontal axial alignment with respect to each other for straight-through flow with a minimum of resistance. Also, locating the fittings 88 and 90 in horizontal axial alignment results in a pump 12 which will operate in either direction to pump the fluid therethrough in either direction merely by reversing the direction of rotation of the motor 10 to reverse the directions of rotation of the output shafts 26 and 28 and the impellers 84 and 86.

The impellers 84 and 86 are of the gear type and are intended primarily for handling liquids. However, impellers of other types may be substituted for the impellers 84 and 86. For example, referring to Fig. 5 of the drawing, lobe type impellers 92 and 94 for handling semi-solids may be substituted for the impellers 84 and 86 respectively. As will be apparent, the impellers 92 and 94 may be substituted for the impellers 84 and 86 very readily because of the loose fits on the squared projecting shaft ends 30 and 32 arising from the use of "Teflon" impellers. In order to change impellers it obviously is merely necessary to remove the pump housing cover 60, remove the impellers from the projecting shaft ends 30 and 32, slip the substitute impellers on the projecting shaft ends, and replace the pump housing cover, which is an important feature.

Although I have disclosed an exemplary embodiment of my invention herein for purposes of illustration, it will be understood that various minor changes, modifications and substitutions may be incorporated in such embodiment without departing from the spirit of the invention as defined by the claims hereinafter appearing.

I claim as my invention:

1. A motor and pump combination, including: a pedestal; a vertically oriented gear case carried by said pedestal; two parallel, horizontal output shafts rotatably mounted in said gear case one above the other in vertical alignment and having ends projecting from one side of said gear case; a motor mounted on the opposite side of said gear case adjacent the upper end thereof and having an input shaft which is parallel to said output shafts and which extends into said gear case above and in vertical alignment with said output shafts; gear means on said input and output shafts within said gear case for transmitting rotation of said input shaft by said motor to said output shafts; a pump housing removably mounted on said one side of said gear case adjacent the lower end thereof and enclosing said projecting ends of said output shafts, the centerline of said motor thus being a substantial distance above the centerline of said pump housing, said pump housing being provided with an inlet and an outlet; and two cooperating pump impellers respectively mounted on said projecting ends of said output shafts within said pump housing.

2. A motor and pump combination, including: a pedestal; a vertically oriented gear case carried by said pedestal and integral therewith; two parallel, horizontal output shafts rotatably mounted in said gear case one above the other in vertical alignment and having ends projecting from one side of said gear case; a motor mounted on the opposite side of said gear case adjacent the upper end thereof and having an input shaft which is parallel to said output shafts and which extends into said gear case above and in vertical alignment with said output shafts; two meshed gears mounted on said output shafts, respectively, within said gear case so that rotation of the uppermost of said output shafts in one direction results in rotation of the lowermost of said output shafts in the opposite direction; a drive gear on said input shaft within said gear case and meshed with said gear on the uppermost of said output shafts; a pump housing removably mounted on said one side of said gear case adjacent the lower end thereof and enclosing said projecting ends of said output shafts, the centerline of said motor thus being a substantial distance above the centerline of said pump housing, said pump housing being provided with an inlet and an outlet which are horizontally aligned; and cooperating pump impellers respectively mounted on said projecting ends of said output shafts in said pump housing.

3. A motor and pump combination, including: a pedestal; a vertically oriented gear case carried by said pedestal; two parallel, horizontal output shafts rotatably mounted in said gear case one above the other in vertical alignment and having ends projecting from one side of said gear case; a motor mounted on the opposite side of said gear case adjacent the upper end thereof and having an input shaft which is parallel to said output shafts and which extends into said gear case above and in vertical alignment with said output shafts; two meshed gears mounted on said output shafts, respectively, within said gear case, whereby rotation of the uppermost of said output shafts in one direction results in rotation of the lowermost of said output shafts in the opposite direction; a drive gear on said input shaft within said gear case and meshed with said gear on the uppermost of said output shafts; a pump housing removably mounted on said one side of said gear case adjacent the lower end thereof and enclosing said projecting ends of said output shafts, the centerline of said motor thus being a substantial distance above the centerline of said pump housing, said pump housing being provided with an inlet and an outlet; two cooperating pump impellers respectively mounted on said projecting ends of said output shafts within said pump housing; two gear case seals interposed between said gear case and said output shafts, respectively, to prevent leakage from said gear case along said output shafts; and two pump housing seals interposed between said pump housing and said output shafts, respectively, to prevent leakage from said pump housing along said output shafts, said pump housing seals being carried by said pump housing and being axially slidable relative to said output shafts so that said pump housing seals are automatically removed from said output shafts upon removal of said pump housing from said gear case.

4. In combination: a gear case; two parallel output shafts rotatably mounted in said gear case and having ends projecting from one side of said gear case; gear means in said gear case, including gears on said output shafts within said gear case, for rotating said output shafts in opposite directions; a pump housing removably mounted on said one side of said gear case and provided with openings through which said projecting ends of said output shafts extend into the interior of said pump housing, said pump housing being provided with an inlet and an outlet and being provided with two annular grooves respectively formed in the peripheral walls of said openings and each having a peripheral wall and two side walls; two cooperating pump impellers respectively mounted on said projecting ends of said output shafts within said pump housing; two gear case seals interposed between said gear case and said output shafts, respectively, to prevent leakage from said gear case along said output shaft; and two O-ring seals respectively disposed in said annular grooves in said pump housing and respectively engaging said output shafts to prevent leakage from said pump housing along said output shafts, said O-ring seals being axially slidable relative to said output shafts so that they are automatically removed from said output shafts upon removal of said pump housing from said gear case due to the fact that they are carried in said annular grooves in said pump housing.

5. A motor and pump combination, including: a pedestal; a vertically oriented gear case carried by said pedestal; two parallel, horizontal output shafts rotatably mounted in said gear case one above the other in vertical alignment and having ends projecting from one side of said gear case; a motor mounted on the opposite side of said gear case adjacent the upper end thereof and having an input shaft which is parallel to said output shafts and which extends into said gear case above and in vertical alignment with said output shafts; gear means on said input and output shafts within said gear case for transmitting rotation of said input shaft by said motor to said output shafts; a pump housing on said one side of said gear case adjacent the lower end thereof and enclosing said projecting ends of said output shafts, the centerline of said motor thus being a substantial distance above the centerline of said pump housing, said pump housing being provided with an inlet and an outlet, and said pump housing including a pump housing body and a cover therefor; means for removably connecting said pump housing body to said gear case and said cover to said pump housing body, including studs extending through said pump housing body and threaded into said gear case and having heads seated against said pump housing body, and including nuts threaded on said studs outwardly of said heads and seated against said cover; and two cooperating pump impellers respectively mounted on said projecting ends of said output shafts within said pump housing.

6. In combination: a gear case; two parallel output shafts rotatably mounted in said gear case and having ends projecting from one side of said gear case; gear means in said gear case for rotating at least one of said output shafts; a pump housing on said one side of said gear case and enclosing said projecting ends of said output shafts, said pump housing being provided with an inlet and an outlet and including a pump housing body and cover therefor; means for removably connecting said pump housing body to said gear case and said cover to said pump housing body, including studs extending through said pump housing body and threaded into said gear case and having heads seated against said pump housing body, and including nuts threaded on said studs outwardly of said heads and seated against said cover; and two cooperating pump impellers respectively mounted on said projecting ends of said output shafts within said pump housing.

7. A motor and pump combination as defined in claim 2 wherein said gears are metallic and said pump impellers are nonmetallic.

8. A motor and pump combination as defined in claim 2 wherein said gears are metallic and wherein said pump impellers are formed of a polymerized tetrafluoroethylene resin.

9. In combination: a vertically oriented gear case; two parallel, horizontal output shafts rotatably mounted in said gear case one above the other in vertical alignment and having ends projecting from one side of said gear case; a motor mounted on the other side of said gear case at the upper end of said gear case with its centerline above and in vertical alignment with said output shafts, said motor having an input shaft which is parallel to said output shafts and which extends into said gear case above and in vertical alignment with said output shafts; gear means on said input and output shafts within said gear case for transmitting rotation of said input shaft to said output shafts; a pump housing removably mounted on said one side of said gear case adjacent the lower end thereof and enclosing said projecting ends of said output shafts, said input shaft thus being a substantial distance above the centerline of said pump housing, said pump housing being provided with an inlet and an outlet; and two cooperating pump impellers respectively mounted on said projecting ends of said output shafts within said pump housing.

References Cited in the file of this patent
UNITED STATES PATENTS

| | | |
|---|---|---|
| 1,669,050 | Grant | May 8, 1928 |
| 2,035,096 | Schneider | Mar. 24, 1936 |
| 2,195,886 | Hawley | Apr. 2, 1940 |
| 2,279,136 | Funk | Apr. 7, 1942 |
| 2,321,609 | Marco | June 15, 1943 |
| 2,407,753 | Walgren | Sept. 17, 1946 |
| 2,467,524 | Fernstrum | Apr. 19, 1949 |
| 2,567,699 | Devlin | Sept. 11, 1951 |
| 2,633,807 | Collura | Apr. 7, 1953 |
| 2,635,552 | Dale et al. | Apr. 21, 1953 |
| 2,642,808 | Thomas | June 23, 1953 |

OTHER REFERENCES

Teflon, article in Du Pont de Nemours & Co. publication received in Patent Office August 8, 1952.

Teflon, Chicago Gasket Co., Bulletin B-4A, received in Patent Office June 10, 1952.

Ser. No. 416,566, Waseige (A.P.C.), published May 25, 1943.